United States Patent
Li

(10) Patent No.: US 12,133,040 B2
(45) Date of Patent: Oct. 29, 2024

(54) HEADSET CHARGING SYSTEM AND HEADSET CHARGING METHOD THEREOF

(71) Applicant: Merry Electronics Co., Ltd., Taichung (TW)

(72) Inventor: Hung-Yuan Li, New Taipei (TW)

(73) Assignee: Merry Electronics Co., Ltd., Taichung (TW)

(*) Notice: Subject to any disclaimer, the term of this patent is extended or adjusted under 35 U.S.C. 154(b) by 166 days.

(21) Appl. No.: 17/838,275

(22) Filed: Jun. 13, 2022

(65) Prior Publication Data

US 2023/0379613 A1    Nov. 23, 2023

(30) Foreign Application Priority Data

May 18, 2022   (TW) .................. 111118490

(51) Int. Cl.
*H04R 1/10* (2006.01)
*H02J 7/00* (2006.01)

(52) U.S. Cl.
CPC ........ *H04R 1/1025* (2013.01); *H02J 7/00034* (2020.01); *H02J 7/00712* (2020.01); *H04R 1/1041* (2013.01); *H02J 2207/20* (2020.01)

(58) Field of Classification Search
CPC ...... H04R 1/1025; H04R 1/1041; H04R 1/10; H02J 7/00034; H02J 7/00712; H02J 2207/20; H02J 7/00
See application file for complete search history.

(56) References Cited

U.S. PATENT DOCUMENTS

2022/0060033 A1* 2/2022 Bang .................. H04R 1/1025

FOREIGN PATENT DOCUMENTS

| CN | 213367459 | * | 10/2020 | ............... | H02J 7/00 |
| CN | 212258494 | * | 12/2020 | ............... | H02J 7/00 |

* cited by examiner

*Primary Examiner* — Yosef K Laekemariam
(74) *Attorney, Agent, or Firm* — JCIPRNET

(57) ABSTRACT

A headset charging system and a headset charging method thereof are provided. The headset charging system includes an earphone device and a charging device. The earphone device or the charging device adjusts a charge current to switch between a first current and a second current, so as to perform data transmission between the earphone device and the charging device.

9 Claims, 4 Drawing Sheets

HEADSET CHARGING SYSTEM AND HEADSET CHARGING METHOD THEREOF

CROSS-REFERENCE TO RELATED APPLICATION

This application claims the priority benefit of Taiwan application serial no. 111118490, filed on May 18, 2022. The entirety of the above-mentioned patent application is hereby incorporated by reference herein and made a part of this specification.

BACKGROUND

Technical Field

The disclosure relates to a charging device, in particular to a headset charging system and a headset charging method thereof.

Description of Related Art

Generally speaking, wireless earphones have batteries to supply the power required for wireless earphone operation. In addition, wireless earphones are usually equipped with a dedicated earphone charging case. The earphone charging case can be used to accommodate the wireless headset and provide AC voltage, so the wireless headset needs a rectifier circuit to convert AC voltage to DC voltage to charge the battery of the wireless headset. Furthermore, the earphone charging case can provide unidirectional communication to the wireless earphones.

SUMMARY

The disclosure provides a headset charging system and a charging method thereof, capable of realizing bidirectional communication between a charging device and an earphone device.

The headset charging system of the disclosure includes an earphone device and a charging device. The earphone device includes an earphone battery and a charging circuit. The charging circuit is coupled to the earphone battery and a signal input end of the earphone device. The charging device is used to accommodate and couple the earphone device to provide a charge current. The charging circuit charges the earphone battery according to the charge current. The charging device or the earphone device adjusts the charge current to switch between a first current and a second current to perform data transmission between the earphone device and the charging device.

According to an embodiment of the disclosure, the earphone device includes a control circuit. The control circuit is coupled to the charging circuit and controls the charging circuit to adjust the charge current to switch between the first current and the second current. A sensing circuit is coupled to the control circuit and the signal input end of the earphone device, and senses the charge current to generate a sensing signal. The control circuit determines the data transmitted by the charging device according to the sensing signal.

According to an embodiment of the disclosure, the charging circuit has a charge current setting pin. The earphone device includes an impedance circuit, and the impedance circuit is coupled to the control circuit and the charge current setting pin. The impedance circuit is controlled by the control circuit to change impedance. The charging circuit adjusts the charge current to switch between the first current and the second current in response to an impedance change of the impedance circuit.

According to an embodiment of the disclosure, the impedance circuit includes a transistor. A collector and an emitter of the transistor are respectively coupled to the charge current setting pin and a ground voltage. A base of the transistor is coupled to the control circuit. The resistor is coupled between the base and the emitter of the transistor, and the control circuit controls an on state of the transistor to adjust the impedance of the impedance circuit.

According to an embodiment of the disclosure, the sensing circuit includes a capacitor and a transistor. One end of the capacitor is coupled to the signal input end of the earphone device. A base of the transistor is coupled to the other end of the capacitor. A collector and an emitter of the transistor are respectively coupled to an operating voltage and a ground voltage. The collector of the transistor is further coupled to the control circuit, and the sensing signal is generated at the collector of the transistor.

According to an embodiment of the disclosure, the charging device includes a rechargeable battery, a DC-DC conversion circuit, a control circuit, a current adjustment circuit, and a sensing circuit. The rechargeable battery provides a DC voltage. The DC-DC conversion circuit is coupled to the rechargeable battery, and converts the DC voltage into an output voltage. The control circuit is coupled to the DC-DC conversion circuit. The current adjustment circuit is coupled to the control circuit, the DC-DC conversion circuit, and a signal output end of the charging device, generates the charge current according to the output voltage, and is controlled by the control circuit to adjust the charge current to transmit data provided by the control circuit. The sensing circuit is coupled to the control circuit and the signal output end of the charging device, and senses the charge current to generate a sensing signal. The control circuit determines the data transmitted by the earphone device according to the sensing signal.

According to an embodiment of the disclosure, the current adjustment circuit includes a transistor and a resistor. An emitter and a collector of the transistor are respectively coupled to the DC-DC conversion circuit and the signal output end of the charging device, and a base of the transistor is coupled to the control circuit. The resistor is coupled between the emitter and the base of the transistor, and the control circuit controls an on state of the transistor to adjust the charge current.

According to an embodiment of the disclosure, the control circuit controls the current adjustment circuit to adjust a current value of the charge current, and determines whether the earphone device can receive the data transmitted by the charging device according to the sensing signal.

The disclosure further provides a charging method of a headset charging system. The headset charging system includes an earphone device and a charging device. The charging method of the headset charging system includes the following steps. A charge current is provided through the charging device. An earphone battery of the earphone device is charged according to the charge current through a charging circuit of the earphone device. The earphone device or the charging device are controlled to adjust the charge current to switch between a first current and a second current to perform data transmission between the earphone device and the charging device.

According to an embodiment of the disclosure, the earphone device includes an impedance circuit coupled to a charge current setting pin of the charging circuit. The charging method of the headset charging system includes the following. Impedance of the impedance circuit is adjusted, so that the charging circuit adjusts the charge current to switch between the first current and the second current in response to an impedance change of the impedance circuit.

According to an embodiment of the disclosure, the charging method of the headset charging system includes the following steps. A current value of the charge current is adjusted. The charge current is sensed to generate a sensing signal. Whether the earphone device can receive the data transmitted by the charging device is determined according to the sensing signal.

Based on the above, the earphone device or the charging device according to the embodiment of the disclosure may adjust the charge current of the charging device to charge the earphone battery to switch between the first current and the second current, so as to perform data transmission between the earphone device and the charging device, and the bidirectional communication between the charging device and the earphone device may be realized.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
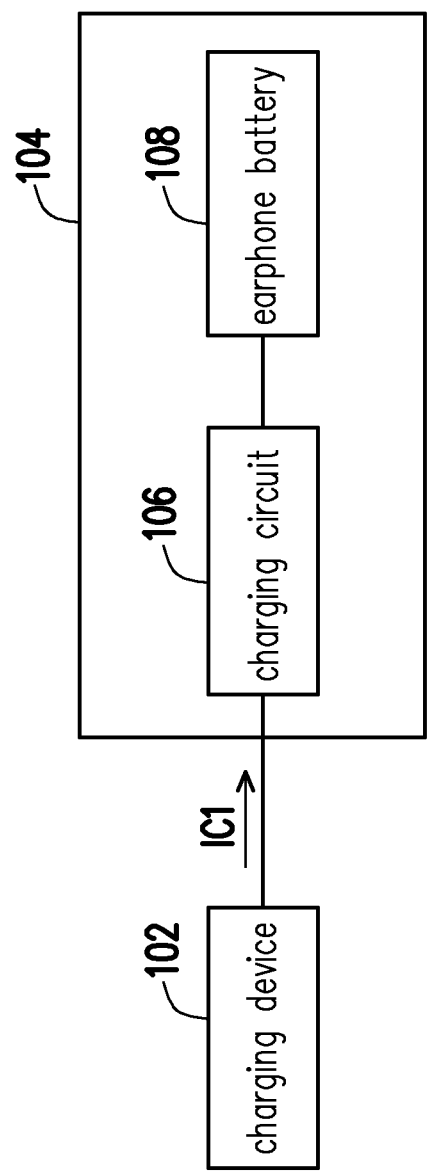
FIG. 1 is a schematic diagram of a headset charging system according to an embodiment of the disclosure.

FIG. 1 is a schematic diagram of a headset charging system according to an embodiment of the disclosure. Referring to FIG. 1, a headset charging system includes a charging device 102 and an earphone device 104. The charging device 102 is used to accommodate and couple the earphone device 104. The earphone device 104 may include a charging circuit 106 and an earphone battery 108, and the charging circuit 106 is coupled to a signal input end of the earphone device 104 and the earphone battery 108. The earphone battery 108 may be, for example, a lithium-ion (Li-Ion) battery, a lithium polymer (Li-polymer) battery or a nickel-metal hydride (NiMH) battery, but not limited thereto. In addition, the charging circuit 106 may be implemented by a BQ25173 chip from Texas Instruments, for example, but not limited thereto.

The charging device 102 may provide a DC charge current IC1 to the earphone device 104 through a power transmission line or a pogo pin, but not limited thereto. The charging circuit 106 of the earphone device 104 may charge the earphone battery 108 according to the charge current IC1, and the charging device 102 may transmit a data signal to the earphone device 104 by adjusting the charge current IC1 to switch between a first current and a second current (e.g., switch between 50 mA and 60 mA, but not limited thereto). Similarly, the earphone device 104 may also transmit the data signal to the charging device 102 by adjusting the charge current ICI to switch between the first current and the second current. During a period when the charging device 102 or the earphone device 104 transmits the data signal, the charge current ICI provided by the charging device 102 may still charge the earphone battery 108.

In this way, the charging device 102 provides the DC charge current IC1 to the earphone device 104, and during data transmission, the charging device 102 or the earphone device 104 adjusts the charge current IC1 to switch between the first current and the second current, so that bidirectional communication between the charging device 102 and the earphone device 104 may be realized. The data transmitted between the charging device 102 and the earphone device 104 may include, for example, power of the earphone device 104, a pairing status command, an acknowledgement (ACK) signal, a negative acknowledgement (NACK) signal, a standby mode command, a sleep mode command, or a firmware update command, but not limited thereto.

Figure 2:
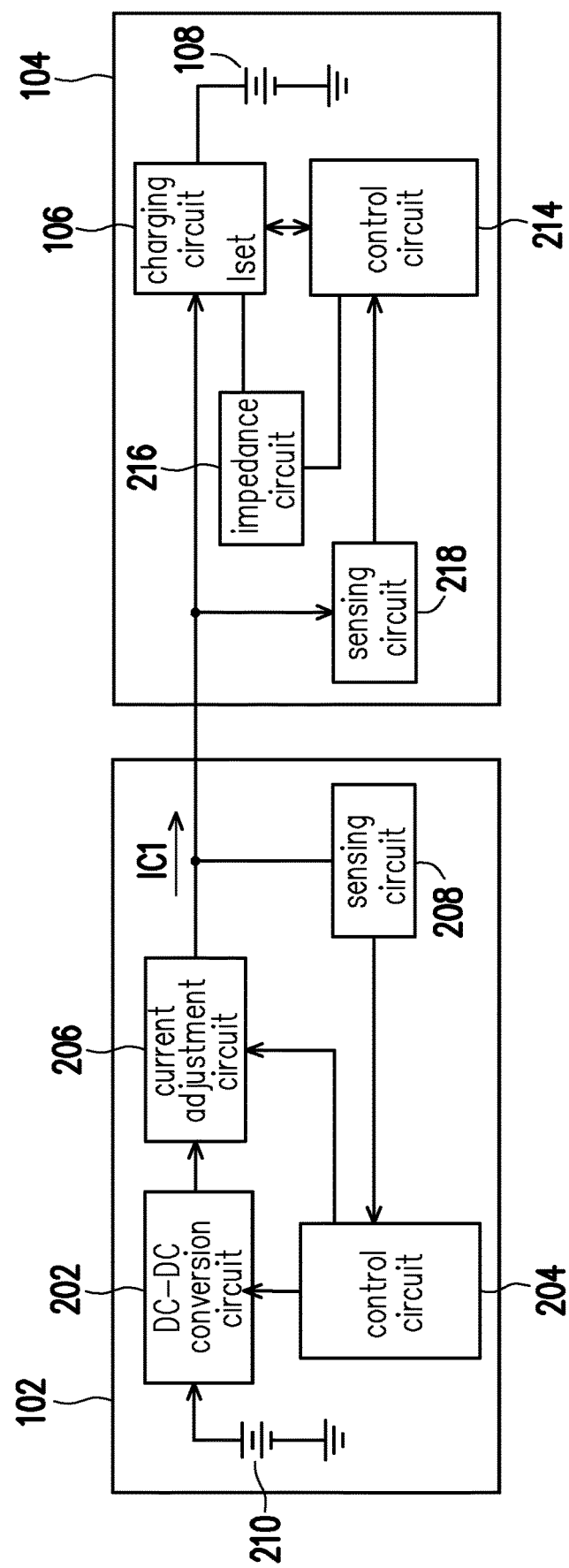
FIG. 2 is a schematic diagram of a headset charging system according to another embodiment of the disclosure.

Further, the headset charging system may be implemented as shown in FIG. 2. According to the embodiment of FIG. 2, the charging device 102 may include a DC-DC conversion circuit 202, a control circuit 204, a current adjustment circuit 206, a sensing circuit 208, and a rechargeable battery 210. The control circuit 204 is coupled to the DC-DC conversion circuit 202, the current adjustment circuit 206, and the sensing circuit 208. The DC-DC conversion circuit 202 is coupled to the current adjustment circuit 206 and the rechargeable battery 210. The current adjustment circuit 206 is coupled to a signal output end of the charging device 102, and the sensing circuit 208 is coupled to a signal output end of the charging device 102. In addition to the charging circuit 106 and the earphone battery 108, the earphone device 104 further includes a control circuit 214, an impedance circuit 216, and a sensing circuit 218. The control circuit 214 is coupled to the charging circuit 106, the impedance circuit 216, and the sensing circuit 218. The impedance circuit 216 is coupled to the control circuit 214 and a charge current setting pin Iset of the charging circuit 106. The sensing circuit 218 is further coupled to the signal input end of the earphone device 104.

Figure 3:
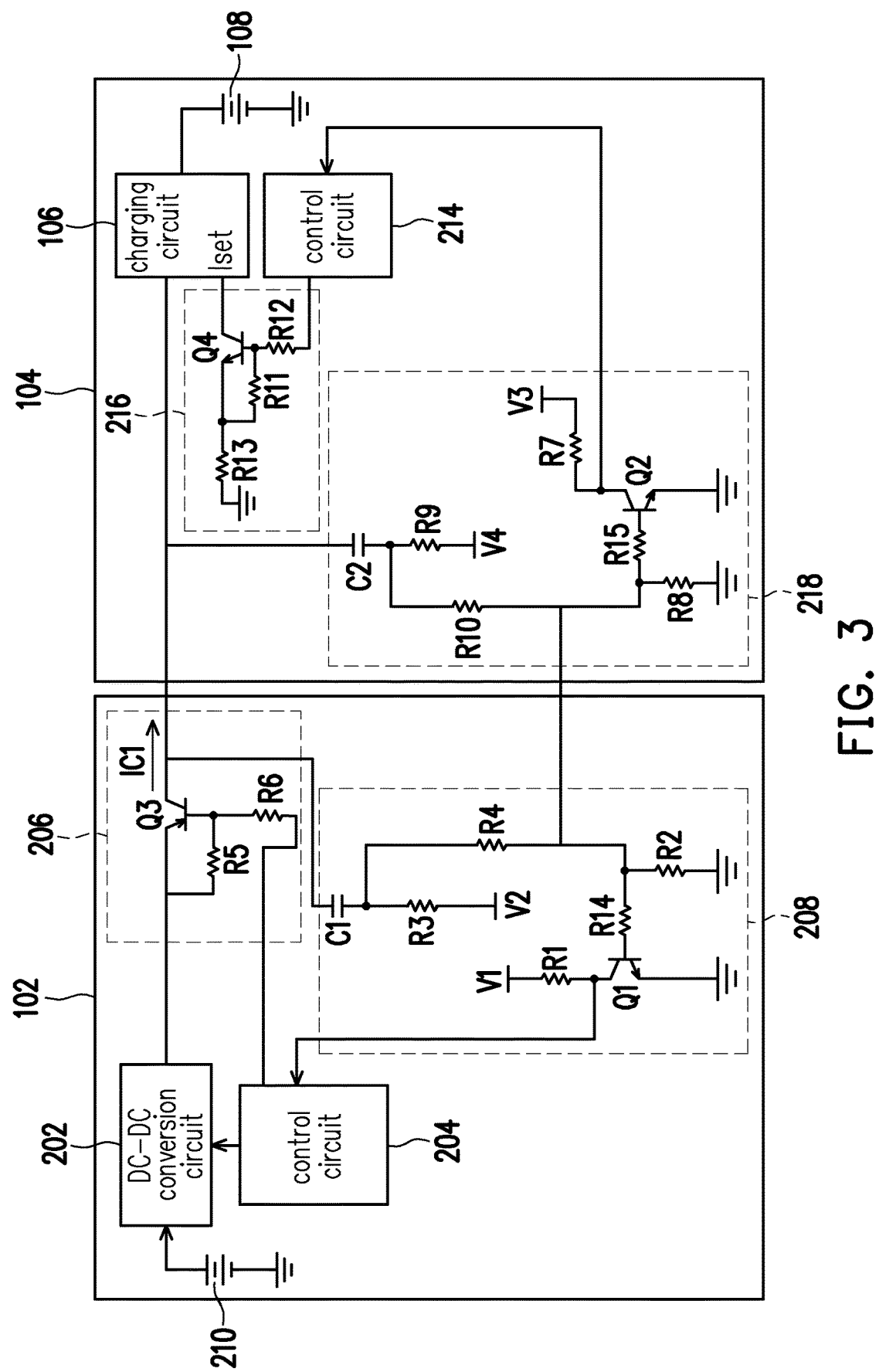
FIG. 3 is a schematic diagram of a headset charging system according to another embodiment of the disclosure.

The rechargeable battery 210 may provide a DC voltage to the DC-DC conversion circuit 202, so that the DC-DC conversion circuit 202 converts the DC voltage into an output voltage. The DC-DC conversion circuit 202 may be, for example, a booster circuit, but is not limited thereto. The control circuit 204 may control the current adjustment circuit 206 to generate the charge current ICI according to the output voltage provided by the DC-DC conversion circuit 202, and control the current adjustment circuit 206 to adjust the charge current IC1 to switch between the first current and the second current to transmit the data to be transmitted by the control circuit 204 to the earphone device 104. As shown in FIG. 3, the current adjustment circuit 206 includes resistors R5, R6 and a transistor Q3. An emitter and a collector of the transistor Q3 are respectively coupled to an output end of the DC-DC conversion circuit 202 and the signal output end of the charging device 102. The resistor R5 is coupled between a base and the emitter of the transistor Q3, and the resistor R6 is coupled between the base of the transistor Q3 and the control circuit 204. The control circuit 204 may adjust a current value of the charge current IC1 generated at the collector of the transistor Q3 by controlling an on state of the transistor Q3, for example, by adjusting the charge current IC1 to switch between the first current and the second current. It should be noted that the implementation of the current adjustment circuit 206 is not limited to this embodiment, for example, according to some embodiments, the resistor R6 may be omitted.

In the earphone device 104, the sensing circuit 218 may sense a voltage change caused by a current change of the charge current IC1, and generate a corresponding sensing signal to the control circuit 214. The control circuit 214 may determine the data transmitted by the charging device 102 according to the sensing signal. For example, the sensing circuit 218 may generate a first voltage and a second voltage in response to the sensed first current and second current. The first voltage and the second voltage may, for example, represent the data transmitted as "0" and "1" respectively, and the control circuit 214 may determine the data transmitted by the charging device 102 according to the first voltage and the second voltage generated in the sequence. The sensing circuit 218 may be implemented as shown in FIG. 3, and includes resistors R7 to R10, R15, a transistor Q2, and a capacitor C2. The capacitor C2 is coupled between the signal input end of the earphone device 104 and one end of the resistor R9. The other end of the resistor R9 is coupled to a reference voltage V4. The resistor R10 and the resistor R15 are connected in series between a common contact of the capacitor C2 and the resistor R9 and a base of the transistor Q2. The resistor R8 is coupled between the base of the transistor Q2 and the ground. The resistor R7 is coupled between the reference voltage V3 and a collector of the transistor Q2. The collector of the transistor Q2 is coupled to the control circuit 214, an emitter of the transistor Q2 is coupled to ground, and the sensing signal may be generated at the collector of the transistor Q2. It should be noted that the implementation of the sensing circuit 218 is not limited to this embodiment, for example, according to some embodiments, the sensing circuit 218 may also omit the resistors R7 to R10 and R15.

On the other hand, the control circuit 214 in the earphone device 104 may control the impedance circuit 216 to change impedance, so that the charging circuit 106 adjusts the charge current IC1 to switch between the first current and the second current in response to an impedance change of the impedance circuit 216. Specifically, the impedance circuit 216 of the earphone device 104 may be shown in FIG. 3, and includes resistors R11 to R13 and a transistor Q4. A collector of the transistor Q4 is coupled to the charge current setting pin Iset of the charging circuit 106. The resistor R11 is coupled between a base and an emitter of the transistor Q4. The resistor R12 is coupled between the base of the transistor Q4 and the control circuit 214. The resistor R13 is coupled between the emitter of the transistor Q4 and the ground. The control circuit 214 may control an on state of the transistor Q4 to change the impedance of the impedance circuit 216, and then adjusts the current value of the charge current IC1 for data transmission. However, the implementation of adjusting the current value of the charge current IC1 is not limited to this embodiment. For example, according to some embodiments, firmware design provided by the charging circuit 106 may be used to adjust the current value of the charge current IC1, and the impedance circuit 216 may be omitted.

The sensing circuit 208 of the charging device 102 may sense the current change of the charge current IC1 to change a voltage entering the capacitor C1, and generate a corresponding sensing signal to the control circuit 204. The control circuit 204 may determine the data transmitted by the earphone device 104 according to the sensing signal of the sensing circuit 208. Similarly, the sensing circuit 208 may generate a first voltage and a second voltage in response to the sensed first current and second current. The first voltage and the second voltage may, for example, represent the data transmitted as "0" and "1" respectively, and the control circuit 204 may determine the data transmitted by the earphone device 104 according to the first voltage and the second voltage generated in the sequence. In detail, the sensing circuit 208 may be implemented as shown in FIG. 3, and includes resistors R1 to R4, R14, a transistor Q1, and a capacitor C1. The capacitor C1 is coupled between the signal output end of the charging device 102 and one end of the resistor R3, and the other end of the resistor R3 is coupled to a reference voltage V2. The resistor R4 and the resistor R14 are connected in series between a common contact of the capacitor C1 and the resistor R3 and a base of the transistor Q1. The resistor R2 is coupled between a base of the transistor Q1 and the ground. The resistor R1 is coupled between the reference voltage V1 and a collector of the transistor Q1. The collector of the transistor Q1 is coupled to the control circuit 204. An emitter of the transistor Q1 is coupled to ground, and the sensing signal may be generated at the collector of the transistor Q1. Similarly, the implementation of the sensing circuit 208 is not limited to this embodiment. For example, according to some embodiments, the sensing circuit 208 may also omit the resistors R1 to R4 and R14.

According to some embodiments, in addition to determining the data transmitted by the earphone device 104 through the sensing signal of the sensing circuit 208, the control circuit 204 may also determine whether the earphone device 104 can receive the data transmitted by the charging device 102 by sensing the sensing signal obtained from the charge current IC1 by the sensing circuit 208 when controlling the current adjustment circuit 206 to adjust the charge current ICI to transmit data, i.e., determine whether the charge current ICI provided by the signal output end of the charging device 102 is correctly transmitting data. If it is determined that the charge current ICI provided at the signal output end of the charging device 102 is not transmitting data correctly, the control circuit 204 controls the current adjustment circuit 206 to readjust the charge current ICI (e.g., adjusting a current level of the charge current ICI or fine-tuning the current values of the first current and the second current) to ensure that the charging device 102 can transmit data correctly. In addition, according to some embodiments, the earphone device 102 may also adjust a current level that can be sensed by the sensing circuit 218 according to the amount of the received charge current ICI (e.g., adjusting a value of capacitance or resistance in the sensing circuit 218) to correctly receive the data transmitted.

Figure 4:
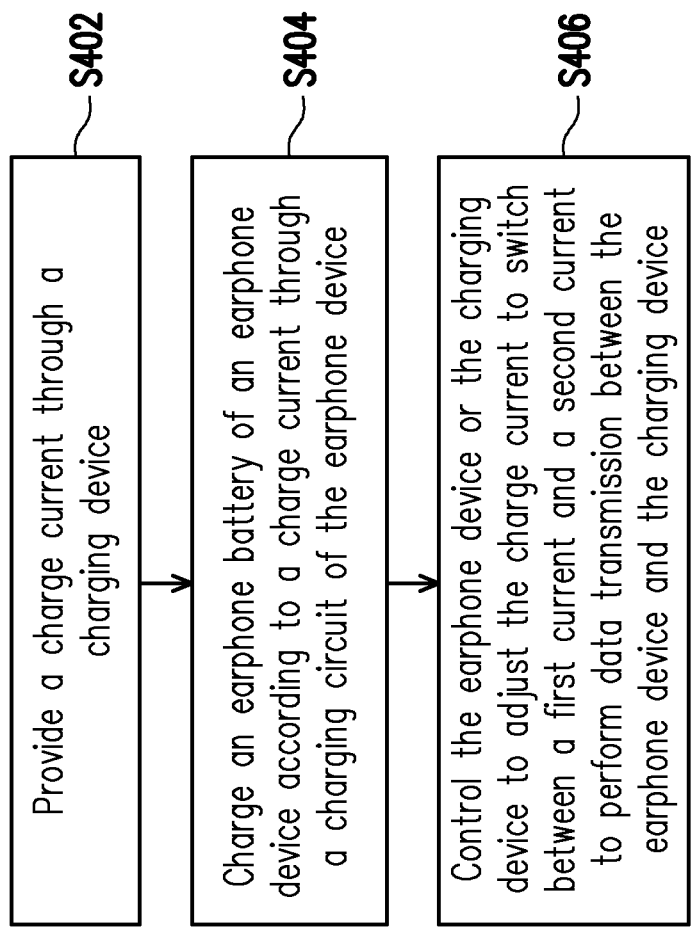
FIG. 4 is a flowchart of a charging method of a headset charging system according to an embodiment of the disclosure.

FIG. 4 is a flowchart of a charging method of a headset charging system according to an embodiment of the disclosure. The headset charging system includes an earphone device and a charging device. It can be known from the above embodiments that the charging method of the headset charging system may include the following steps. First, a charge current is provided through the charging device (step S402). Next, an earphone battery of the earphone device is charged according to the charge current through a charging circuit of the earphone device (step S404). Then, the earphone device or the charging device are controlled to adjust the charge current to switch between a first current and a second current to perform data transmission between the earphone device and the charging device (step S406). The earphone device may include an impedance circuit coupled to a charge current setting pin of the charging circuit. When the earphone device performs data transmission, the charge current may be adjusted to switch between the first current and the second current by adjusting impedance of the impedance circuit in response to changes in the impedance of the impedance circuit. In addition, according to some embodiments, when the charge current adjusted by the charging device performs data transmission, whether the earphone device can receive the data transmitted by the charging device may be determined according to the sensing signal generated by the sensed charge current. That is, the charging device 102 generates a different voltage by generating a different charge current ICI flowing through internal resistance of the charging circuit 106 of the earphone device 104, and then the sensing circuit 208 determines whether the earphone device 104 can receive the data transmitted by the charging device 102 (according to some embodiments, since the sensing circuit 208 of the charging device 102 and the sensing circuit 218 of the earphone device 104 are the same circuit, if the sensing circuit 208 can receive the data transmitted by the charging device 102, the sensing circuit 218 can also receive the data) to determine whether the charge current provided by the charging device transmits the data correctly.

To sum up, the earphone device or the charging device according to the embodiment of the disclosure may adjust the charge current of the charging device to charge the earphone battery to switch between the first current and the second current, so as to perform data transmission between the earphone device and the charging device, and the bidirectional communication between the charging device and the earphone device may be realized.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A headset charging system comprising:
   an earphone device, the earphone device comprising:
   an earphone battery; and
   a charging circuit, coupled to the earphone battery and a signal input end of the earphone device; and
   a charging device, used to accommodate and couple the earphone device to provide a charge current, wherein the charging circuit charges the earphone battery according to the charge current, the charging device or the earphone device performs data transmission between the earphone device and the charging device by switching the charge current between a first current and a second current, wherein the earphone device comprises:
   a control circuit, coupled to the charging circuit, to control the charging circuit to adjust the charge current to switch between the first current and the second current; and
   a sensing circuit, coupled to the control circuit and the signal input end of the earphone device, sensing the charge current to generate a sensing signal, wherein the control circuit determines the data transmitted by the charging device according to the sensing signal.

2. The headset charging system according to claim 1, wherein the charging circuit has a charge current setting pin, and the earphone device comprises:
   an impedance circuit, coupled to the control circuit and the charge current setting pin, wherein the impedance circuit is controlled by the control circuit to change impedance, and the charging circuit adjusts the charge current to switch between the first current and the second current in response to an impedance change of the impedance circuit.

3. The headset charging system according to claim 2, wherein the impedance circuit comprises:
   a transistor, wherein a collector and an emitter of the transistor are respectively coupled to the charge current setting pin and a ground voltage, and a base of the transistor is coupled to the control circuit; and
   a resistor, coupled between the base and the emitter of the transistor, wherein the control circuit controls an on state of the transistor to adjust the impedance of the impedance circuit.

4. The headset charging system according to claim 1, wherein the sensing circuit comprises:
   a capacitor, wherein one end of the capacitor is coupled to the signal input end of the earphone device; and
   a transistor, wherein a base of the transistor is coupled to the other end of the capacitor, a collector and an emitter of the transistor are respectively coupled to an operating voltage and a ground voltage, the collector of the transistor is further coupled to the control circuit, and the sensing signal is generated at the collector of the transistor.

5. The headset charging system according to claim 1, wherein the charging device comprises:
   a rechargeable battery, providing a DC voltage;
   a DC-DC conversion circuit, coupled to the rechargeable battery, converting the DC voltage into an output voltage;
   a control circuit, coupled to the DC-DC conversion circuit;
   a current adjustment circuit, coupled to the control circuit, the DC-DC conversion circuit, and a signal output end of the charging device, generating the charge current according to the output voltage, and controlled by the control circuit to adjust the charge current to transmit data provided by the control circuit; and
   a sensing circuit, coupled to the control circuit and the signal output end of the charging device, sensing the charge current to generate a sensing signal, wherein the control circuit determines the data transmitted by the earphone device according to the sensing signal.

6. The headset charging system according to claim 5, wherein the current adjustment circuit comprises:
   a transistor, wherein an emitter and a collector of the transistor are respectively coupled to the DC-DC conversion circuit and the signal output end of the charging device, and a base of the transistor is coupled to the control circuit; and
   a resistor, coupled between the emitter and the base of the transistor, wherein the control circuit controls an on state of the transistor to adjust the charge current.

7. The headset charging system according to claim 5, wherein the control circuit controls the current adjustment circuit to adjust a current value of the charge current, and determines whether the earphone device can receive the data transmitted by the charging device according to the sensing signal.

8. A charging method of a headset charging system, wherein the headset charging system comprises an earphone device and a charging device, and the charging method of the headset charging system comprises:
   providing a charge current through the charging device;
   charging an earphone battery of the earphone device according to the charge current through a charging circuit of the earphone device, wherein the earphone device comprises an impedance circuit coupled to a charge current setting pin of the charging circuit;

controlling the earphone device or the charging device to perform data transmission between the earphone device and the charging device by switching the charge current between a first current and a second current; and adjusting impedance of the impedance circuit, such that the charging circuit adjusts the charge current to switch between the first current and the second current in response to an impedance change of the impedance circuit.

9. The charging method of the headset charging system according to claim 8 comprising:

adjusting a current value of the charge current;

sensing the charge current to generate a sensing signal; and determining whether the earphone device can receive the data transmitted by the charging device according to the sensing signal.

* * * * *